Figure 1:
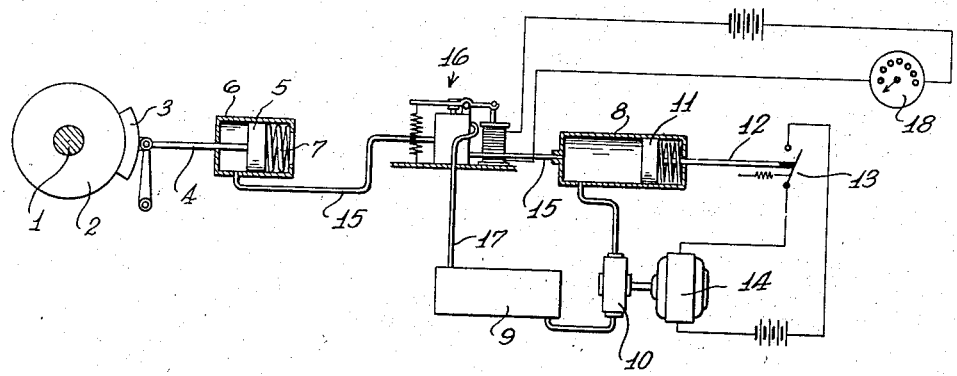

Dec. 14, 1943.   E. H. PIRON   2,336,887
PRESSURE REGULATING VALVE FOR HYDRAULIC BRAKES
Filed Nov. 29, 1940   2 Sheets-Sheet 1

INVENTOR.
Emil H. Piron
BY

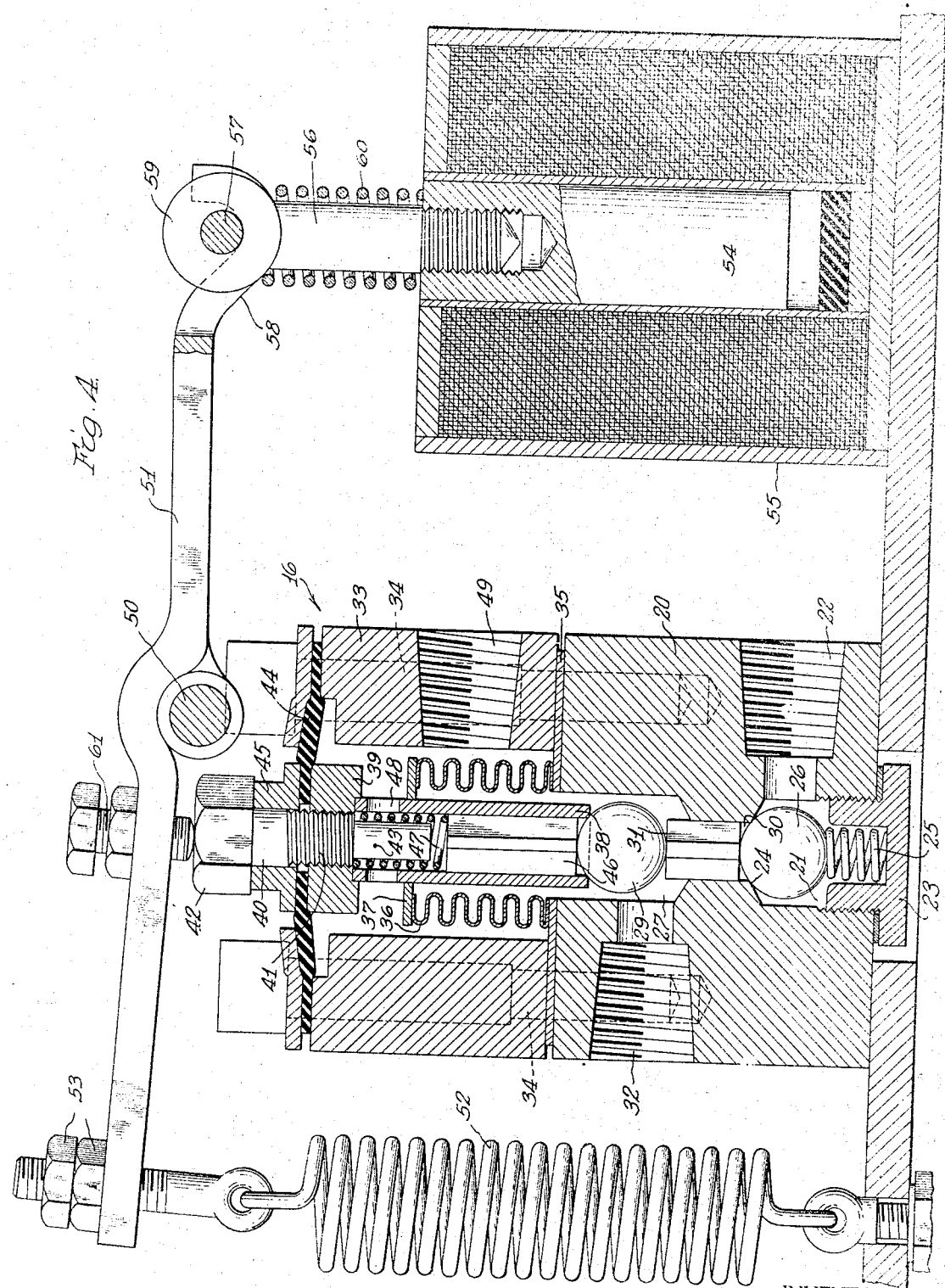

Patented Dec. 14, 1943

2,336,887

UNITED STATES PATENT OFFICE 2,336,887

PRESSURE REGULATING VALVE FOR HYDRAULIC BRAKES

Emil H. Piron, New York, N. Y., assignor to Transit Research Corporation, New York, N. Y., a corporation of New York Application November 29, 1940, Serial No. 367,828

8 Claims. (Cl. 137—153)

This invention relates to pressure regulating valves and has for its primary object to provide a valve for regulating the pressure of the brake operating fluid in a fluid pressure braking system such as is used on street railway vehicles.

The practice in the street car industry is to use frictional braking systems in which the brake application is caused by the action of compressed air and the release by springs, and in some cases the order is reversed and the brake application is caused by pre-loaded springs, and the release by fluid pressure or electro-magnetic means. The present invention is applicable to either system and functions to regulate the fluid pressure in the brake applying means so as to provide any desired braking action.

The present valve assembly comprises a housing formed with a valve chamber having an inlet and an outlet, dual valves controlling the inlet and outlet respectively, means responsive to fluid pressure in the valve chamber for opening the outlet valve, and means for opening the inlet valve. Another object is to provide an arrangement of the type above mentioned wherein the pressure necessary to open the inlet valve is transmitted through the outlet valve in a manner tending to more firmly close the outlet valve.

Another object is to provide an arrangement of the type above mentioned wherein the pressure necessary to open the inlet valve and maintain the outlet valve closed is derived from a spring, and wherein the pressure of the spring is opposed by electro-magnetic means capable of operation through a range from zero opposition to a stage where it completely nullifies the action of the spring. In other words, the spring constitutes a substantially constant pressure means capable of operating the inlet and outlet valves up to the highest pressure range contemplated and the electro-magnet constitutes means for regulating the pressure of the spring to provide for regulation of the fluid pressure from its highest pressure down to zero pressure.

Another object is to provide a valve assembly of the type above mentioned in which the valves and their actuating means vary but a slight amount during operation, in order that equilibrium conditions may be established with displacements amounting to but a few thousandths of an inch. Thus, the device operates on the principle of balancing forces, rather than as a result of movement from one position to another, and therefore accurate pressure regulation may be obtained because the spring reactions remain substantially constant during operation.

Figure 2:
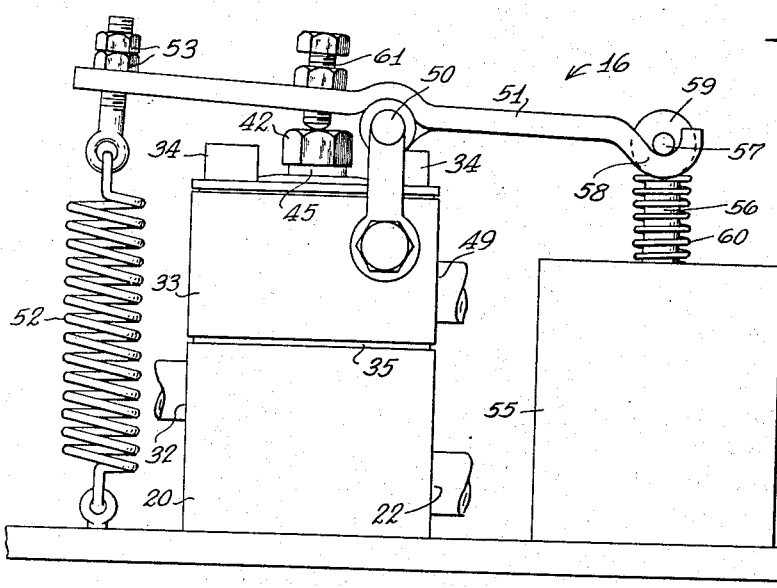
Figure 3:
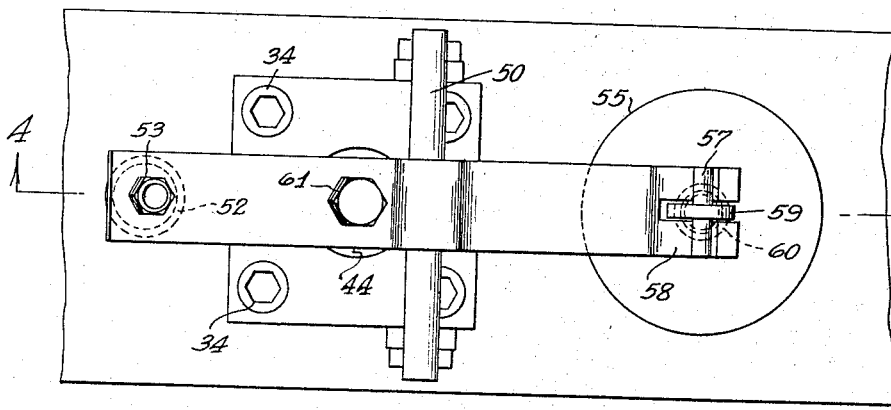

Other objects and advantages will become more fully apparent as reference is had to the accompanying drawings wherein my invention is illustrated, and in which Fig. 1 is a diagram illustrating the present valve in connection with a brake system, Fig. 2 is a side elevation of the valve, Fig. 3 is a plan view of the valve, and Fig. 4 is a vertical cross section of the valve.

In Fig. 1 there is illustrated a shaft 1, which might be imagined as being either an axle shaft or motor shaft of a street railway truck. If the shaft 1 is considered to be the axle of the truck, 2 designates a rail wheel secured thereon, and if it is considered as being a motor shaft, 2 represents a brake drum. Pivoted adjacent the wheel or drum 2 is a brake shoe 3 which is connected by a rod 4 to a piston 5 in a cylinder 6. A spring 7 is mounted in the cylinder for moving the piston in a direction to cause application of the shoe against the wheel or drum 2. The shoe is retracted by fluid pressure supplied to the cylinder as hereinafter described.

The fluid pressure means comprises an accumulator 8 to which oil is pumped from a reservoir 9 by a pump 10. In the accumulator 8 is a spring pressed plunger 11 which makes possible the maintenance of pressure on the liquid, and which has a rod 12 connected thereto for opening a switch 13 in the supply circuit of the motor 14 which operates the pump 10, when the pressure on the liquid in the accumulator reaches a stage which may be predetermined.

The accumulator 8 is connected by a pipe line 15 to the cylinder 6, and a pressure regulating valve 16 is mounted in this line and is connected by another pipe line 17 to the reservoir 9. The valve 16 has a manually operable control 18 for operating the valve to regulate the hydraulic pressure in the cylinder 6 according to the will of the operator. The hydraulic pressure is capable of completely retracting the shoe and therefore by regulating the pressure to pressures less than that exerted by the spring any desired braking pressure may be obtained.

The valve 16 is shown in detail in Fig. 4. It comprises a housing 20 formed with a valve chamber 21 having an inlet port 22 which, according to the diagram of Fig. 1, is connected to the source of liquid under pressure, or, as illustrated, to the accumulator 8. The lower end of the valve chamber 21 is closed by a removable plug 23 and at the upper end of the valve chamber 21 is a valve seat 24. A spring 25 seated against the plug 23 normally holds a ball valve 26 against the seat 24.

Coaxial with the valve chamber 21 is a second valve chamber 27 containing a ball valve 29. The two chambers 21 and 27 are connected by a coaxial bore 30 in which a spacer 31 is slidably received. The spacer 31 is of a cross sectional shape such that it does not prevent flow of liquid through the bore 30, and is of a length such that it holds the ball 29 elevated above the bottom of the chamber 27. The housing 20 has a second port 32, opening into the valve chamber 27 which, in the relationship shown in the diagram, is the port connected to the cylinder 6.

An upper housing section 33 is secured upon the housing 20 by means of bolts 34. Clamped between the two housing sections is a flange 35 upon which a Sylphon bellows 36 is mounted. Secured to the free end of the bellows is a disc 37 in which a tube 38 is axially secured, as by welding. The ball valve 29 is held in seating contact with the lower end of the tube 38 by the spacer 31 when the valve 26 is in contact with the seat 24. Welded or otherwise secured to the upper end of the tube 38 is a nut 39 in which a screw 40 is received. The screw 40 has a threaded part 41, a head 42 and an axial extension or pilot 43 which extends downwardly into the tube 38. A flexible diaphragm 44 is clamped at its outer periphery to the upper end of the housing section 33 and at its center it is clamped between a spacer 45 and the nut 39 by tightening the nut 42 against the spacer.

Slidably mounted in the tube 38 is a spacer 46 of a cross sectional shape such that it does not obstruct the flow of liquid through the tube. The spacer 46 is pressed against the valve 29 by a spring 47 sleeved on the pilot 43. The tube 38 has radial ports 48 located in a plane above the bellows 36 and opening into the interior of the housing section 33. The housing section 33 has an outlet port 49 which, in the arrangement shown in Fig. 1, is connected to the reservoir 9.

Pivotally mounted on a fulcrum 50 is a balancing lever 51. To one end of the lever 51 is connected a tension spring 52, the connection being established by nuts 53 which may be adjusted to regulate the tension of the spring 52. The other end of the lever is connected to the plunger 54 of an electro-magnet 55. The connection between the lever 51 and the plunger 54 is established by a rod 56 having radial pins 57 which engage two hook-like portions 58 on the lever. The pins 57 are held against lateral movement by a flange 59 disposed between the two hooks, and the pins are constantly held in contact with the hooks by a spring 60.

A set screw 61 is mounted in the lever 51 in a position such that it engages the nut 42. The spring 52 is connected on the same side of the fulcrum as the set screw. Therefore, the spring 52 acts to press the tube 38 downwardly and by pressure transmitted through the ball valve 29 and spacer 31, to unseat the valve 26. The magnet 55 acts to counteract the pressure of the spring.

In the position shown in Fig. 4 the tension of the spring 52 is entirely counterbalanced by the magnet 55, and the lever 51 is in an extreme position in which there is no pressure exerted by the set screw 61 other than an initial pressure mentioned later. When used in a brake system as here contemplated oil under pressure ranging from 120 to 180 lbs. is admitted through the port 22 into the valve chamber 21. The valve 26 is, at this time, held against the seat 24 by the spring 25, and as oil under pressure is admitted to the chamber 21 it increases the total pressure holding the valve against its seat.

According to one example, the orifice of the valve seat 24 is ¼ inch and the pressure exerted by the spring 25 is 12 lbs. With oil at a pressure of 120 to 180 lbs. its pressure amounts to 6 to 9 lbs. per square inch so that the total pressure holding the valve 26 against its seat will be 18 to 21 lbs.

The spring 47, whose reaction is 10 lbs. in an upward direction, is compensated mostly by tension in the bellows 36 and partly in the diaphragm 44. In a downward direction it is compensated for through the spacer 46, ball valve 29, spacer 31 and ball valve 26 by the upward reaction of the spring 25. As this last reaction is 12 lbs. pressing the ball 26 against its seat when the oil pressure is zero, the pressure of ball 26 against its seat becomes 8 to 11 lbs. when oil pressure is present. In other words, 10 lbs. are balanced by the action of the bellows 36 and the diaphragm 44.

In correct assembly both valves 26 and 29 contact the spacer 31, with the valve 26 contacting the seat 24 and the valve 29 contacting the lower end of the tube 38. If conditions are not entirely correct the relationship may be varied to obtain them by changing the tension of the spring 52 by means of the nuts 53. In practice it is preferred that the nuts 53 be so disposed as to provide an initial tension on the spring 52 in such manner that the initial balance between the pull of the spring 52 and that of the magnet produce a pressure on the nut 42 sufficient to reduce the tension in the bellows 36 and diaphragm 44 and establish contact between the tube 38 and the ball valve 29 with a few pounds pressure to spare. Any value of such pressure below 5 lbs. has been found to be satisfactory. In describing the operation, however, it is assumed that the initial condition is such as to provide a contact between the tube 38 and the ball 29 without pressure. Any additional pressure added merely corresponds to an initial tension in the spring 52 and such added pressure will be preserved through the working range of the regulator.

It will be noted that the position of the ball valves and of the bellows varies very little during operation. The ball valves are completely open when they move 1/32 of an inch, and equilibrium conditions are established with displacements of a few thousandths of an inch. Hence, the device operates by balancing forces, and not by moving from one position to another, and therefore the spring reactions can be considered as remaining constant during operation.

As above mentioned, with oil entering the chamber 21 at 120 lbs. pressure per square inch, the total pressure on the ball 26 is 18 lbs. Of this pressure, 10 lbs. are balanced by the bellows and diaphragm. If a pressure of 8 lbs. is applied by the set screw 61 on the head 42 the downward pressure on the ball 26 becomes 18 lbs., and the ball is in equilibrium. Any additional pressure on the head 42 will cause the ball valve 26 to open and allow oil to pass through the bore 30 into the chamber 27 and bellows 36. If the additional pressure were 10 lbs., or a total of 18 lbs., ball valve 26 will be unseated until a balancing pressure of 10 lbs. is developed in the bellows 36. With a bellows having an active area of ¼ inch this will be attained when the oil pressure therein is 40 lbs. per square inch, at which time the ball valve will again become seated and will stop the flow. In the same manner, if the pressure on the screw 61 is increased further in 10 lb. amounts, to 28 and to 38 lbs., the balancing oil pressure in the bellows 11 and at the port 32 will be 80 and 100 lbs. per square inch respectively. Therefore, it will be seen that with any pressure P applied by the screw 61 there will be a balancing pressure at the port 32 equal to 4(P—8) lbs. per square inch.

If the pressure of 28 lbs. exerted by the screw 61 which has caused a pressure of 80 lbs. per sq. in. to build up in the bellows and at the port 32, is lowered to 18 lbs., the pressure in the bellows causes the tube 38 to lift above the valve 29. Oil then discharges through the tube 38, ports 48 and port 49 until a new balancing pressure 4(18—8)=40 lbs. per sq. in. is established.

Although a specific embodiment of the invention has been illustrated and described, it will be understood that various changes may be made within the scope of the appended claims without departing from the spirit of the invention, and such changes are contemplated.

What is claimed is:

1. In a pressure regulating valve, a housing having a valve chamber with an inlet and an outlet, dual valves controlling said inlet and said outlet respectively, yielding means normally urging said inlet valve toward closed position, a movable member adapted to move in response to fluid pressure in said chamber for opening said outlet valve, and means for opposing movement of said last named member, said last named means comprising a spring storing sufficient energy to maintain said outlet valve closed through the expected range of fluid pressure and sufficient energy in addition thereto to open said inlet valve against the opposition of said yielding means, an electro-magnet for opposing the action of said spring through a range from zero opposition to a maximum overpowering said spring, and manually controllable means for energizing said magnet to degrees determined by the will of the operator.

2. In a pressure regulating valve, a housing having a valve chamber with an inlet and an outlet, dual valves controlling said inlet and said outlet respectively, yielding means normally urging said inlet valve to closed position, said outlet valve being normally closed, a movable member adapted to move in response to fluid pressure in said chamber for opening said outlet valve, and means for opposing movement of said last named member, said last named means comprising a balancing lever fulcrumed on said housing and adapted to press against said movable member, means exerting a constant pressure on said lever of a magnitude sufficient to maintain said outlet valve closed and sufficient to open said inlet valve, and manually operable means for exerting a force in opposition to said spring and which varies through a range from zero opposition to a magnitude completely nullifying action of the spring.

3. In a pressure regulating valve, a housing having a valve chamber with an inlet and an outlet, dual valves controlling said inlet and said outlet respectively, yielding means normally holding said inlet valve closed, a movable member adapted to move in response to fluid pressure in said chamber for opening said outlet valve, and means for opposing movement of said last named member, said last named means comprising a balancing lever fulcrumed on said housing, a spring acting against one end of said lever for pivoting the same in one direction, means between said lever and said movable member for transmitting the pressure of said spring to said movable member for closing said outlet valve and opening said inlet valve, an electro-magnet for exerting a force on said lever in opposition to said spring, and a variable manual control for energizing said magnet to varying degrees.

4. In a pressure regulating valve assembly, a housing having a valve chamber with an inlet, a valve for closing said inlet, said valve having a spring yieldingly urging it closed and being so disposed that when closed the pressure of the fluid to be controlled tends to hold it closed, a valve in said chamber and connected to the first valve for movement therewith, a flexible sealing means closing said valve chamber, said sealing means having an outlet port adapted to seat against said second valve to prevent exhaust of fluid from said valve chamber, said movable member being adapted to move in response to fluid pressure in said chamber to separate the port from said second valve, and means for opposing action of said movable member, said last named means comprising a spring storing sufficient energy to hold said movable member with the outlet port closed and to unseat said first valve, an electro-magnet for opposing action of said spring, and manually controllable means for energizing said magnet.

5. In a pressure regulating valve assembly, a housing having a valve chamber with an inlet, a valve for closing said inlet, said valve having a spring yieldingly urging it closed and being so disposed that when closed the pressure of the fluid to be controlled tends to hold it closed, a valve in said chamber and connected to the first valve for movement therewith, a flexible sealing means closing said valve chamber, said sealing means having an outlet port adapted to seat against said second valve to prevent exhaust of fluid from said valve chamber, said movable member being adapted to move in response to fluid pressure in said chamber to separate the port from said second valve, and means for opposing action of said movable member, said last named means comprising a balancing lever fulcrumed on said housing and adapted to press against said movable member, means exerting a constant pressure on said lever of a magnitude sufficient to maintain said outlet valve closed and sufficient to open said inlet valve, and manually operable means for exerting a force in opposition to said spring and which varies through a range from zero opposition to a magnitude completely nullifying action of the spring.

6. In a pressure regulating valve, a housing having a valve chamber with an inlet and an outlet, dual valves controlling said inlet and said outlet respectively, yielding means normally holding said inlet valve closed, a movable member adapted to move in response to fluid pressure in said chamber for opening said outlet valve, and means for opposing movement of said last named member, said last named means comprising a rocking lever fulcrumed on said housing, an adjustable member on said lever adapted to engage said movable member, a spring connected to one end of said lever in such manner that it forces said adjustable member against the movable member, and an electro-magnet connected to the other end and acting in opposition to said spring.

7. In a pressure regulating valve, a fluid pressure chamber having a fluid inlet and a valve guarding said inlet, said valve being urged toward its seat by a spring and also by pressure of fluid from a source of fluid pressure supply, a diaphragm forming a wall of said chamber and having a tube therethrough constituting an outlet passage, a ball valve in said chamber closing said outlet passage, a spacer element between said inlet valve and said outlet valve, spring means in said outlet tube opposing seating of said outlet valve, said spring means opposing also the seating of said inlet valve through said outlet valve and said spacer, force regulating means for determining the pressure on said spring means comprising a balanced arm in contact with said spring means intermediate its ends having a spring exerting a pressure on one end of said arm and having a manually controllable solenoid capable of exerting variable pressures on the other end thereof, said inlet valve opening when the force transmitted through said spring means exceeds the combined pressure of the inlet valve spring and the fluid pressure thereagainst and closing when the fluid pressure in said chamber balances the unseating pressures of said spring means, said outlet valve opening upon decrease by said solenoid of pressure applied to said pressure means and remaining open during the period of unbalance therebetween.

8. In a pressure regulating valve, a fluid pressure chamber having a fluid inlet and a valve guarding said inlet, said valve being urged toward its seat by a spring and also by pressure of fluid from a source of fluid pressure supply, a diaphragm forming a wall of said chamber and having a tube therethrough constituting an outlet passage, a ball valve in said chamber closing said outlet passage, a spacer element between said inlet valve and said outlet valve, spring means in said outlet tube opposing seating of said outlet valve, said spring means opposing also the seating of said inlet valve through said outlet valve and said spacer, force regulating means for determining the pressure of said spring means comprising a balanced arm in contact with said spring means intermediate its ends having a spring exerting a pressure on one end of said arm and having a manually controllable solenoid capable of exerting variable pressures on the other end thereof, said inlet valve opening when the force transmitted through said spring means exceeds the combined pressure of the inlet valve spring and the fluid pressure thereagainst and closing when the fluid pressure in said chamber balances the unseating pressures of said spring means, said outlet valve opening upon decrease by said solenoid of pressure applied to said pressure means and remaining open during the period of unbalance therebetween, said fluid chamber having a second outlet open to a second chamber having an expansible wall, said expansible wall being connected to mechanism for doing work.

EMIL H. PIRON.